Figure 1:
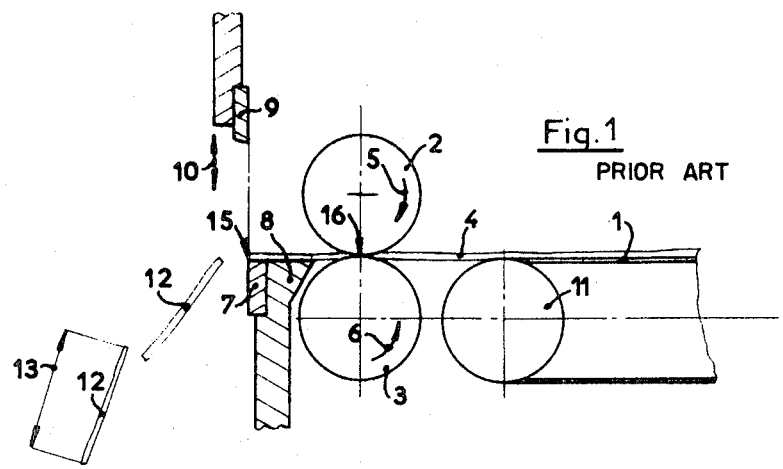

United States Patent
Laroche

[15] 3,651,726
[45] Mar. 28, 1972

| [54] | CUTTING DEVICE FOR FIBROUS MATERIALS |
|---|---|
| [72] | Inventor: Robert Laroche, Rue de Thizy, Cours, France |
| [22] | Filed: Jan. 5, 1970 |
| [21] | Appl. No.: 725 |

[30] Foreign Application Priority Data

Jan. 21, 1969 France..................................6900928
Mar. 11, 1969 France..................................6906628

[52] U.S. Cl. ............................83/169, 83/170, 83/355, 83/436
[51] Int. Cl. ..................................................B26d 5/20
[58] Field of Search ..................83/355, 356, 436, 170; 146/120, 130, 157; 241/222, 263, 262, 186 R; 226/190, 191, 185; 29/125; 144/250

[56] References Cited

UNITED STATES PATENTS

| 1,525,025 | 2/1925 | Dahl et al. ..............................83/355 |
| 945,062 | 1/1910 | Trogdon ...........................144/250 X |
| 387,438 | 8/1888 | Parker....................................146/120 |
| 2,450,277 | 9/1948 | Frudden ................................146/120 |
| 368,435 | 8/1887 | Turvey.................................83/355 X |
| 3,392,770 | 7/1968 | Whisler..................................146/120 |
| 158,671 | 1/1875 | Brown et al............................144/250 |
| 3,486,543 | 12/1969 | Nishimura............................29/125 X |

Primary Examiner—James M. Meister
Attorney—Sughrue, Rothwell, Mion, Zinn & Macpeak

[57] ABSTRACT

A cutting device for fibrous materials comprises a driving device and a cutting device, said driving device including a fixed member 17 and a rotary member, said rotary member having a series of rings 19 of resilient material, such as a rubber or plastics material, said rings 19 being carried by a common shaft 18, and being resiliently loaded towards said fixed member 17. The driving device may either comprise a lower fixed blade 7 and an upper blade 9 with a rising and falling movement, or a lower fixed blade 108 with which there cooperates several rotating blades 110 carried by a drum 111.

10 Claims, 8 Drawing Figures

CUTTING DEVICE FOR FIBROUS MATERIALS

The present invention relates to a cutting machine for use mainly in the textile industry, or in cutting fibrous vegetable products such as tobacco, and has for its object to provide an improvement therein. A machine of this type is fed with a layer of material in loose bulk and cuts the material into short lengths ready for further processing.

Known machines of this type comprise a feed apron which guides a layer of material towards a driving device composed of two rollers. These rollers are usually formed with grooves, and the material passes between these rollers before reaching a lower fixed cutting blade, with an upper cutting blade which rises and falls in relation to the lower blade. The rollers of the driving device turn intermittently, that is to say, they push more material through the blades while the latter are separated, and remain stationary while the upper blade is falling. As they cross, the blades cut the material to the required length, then the upper blade is raised and the cycle recommences.

A disadvantage of this type of machine arises when an excessively thick layer of material is introduced into the machine by the feed apron. Since the upper roller of the drive can bear only on the top of the excessively thick layer, at the moment of cutting, the material not held by the rollers is dragged by the upper blade which can cause jamming of the machine. In addition, a further disadvantage arises when there is a relatively large distance between the point of contact of the feed rollers and the edge of the fixed lower blade. All the threads, cloth or fibers which have an end in this zone are not held and therefore jamming can occur when the upper blade is lowered and drags the material.

According to the invention, a cutting machine for fibrous materials comprises a driving device and a cutting device, the driving device including a fixed member and a rotary member, the rotary member having a series of rings of resilient material carried by a common shaft, and being resilient loaded towards the fixed member.

Preferably the fixed member comprises a trough defining with the surface of the rotary member a gap of diminishing width. A fixed cutting blade forming part of the cutting device may be fixed to the fixed member adjacent to the but downflow of the nip between the fixed and rotary members. The rings may be made from a flexible material such as a rubber or a plastics material. Adjustable stops can be provided at the ends of the rotary member to regulate the extent of movement of that member under the action of its resilient loading.

A feed belt may be provided in the machine for delivering material to the driving device, and a small transverse roller may be interposed between the feed belt and the driving device, the small roller turning synchronously with the rotary member.

The cutting device of the machine may either comprise a lever fixed blade and an upper blade with a rising and falling movement, or a lower fixed blade with which there cooperates several rotating blades carried by a drum.

Preferably the cutting machine is provided with a coolant distributor above the fixed blade.

Figure 2:
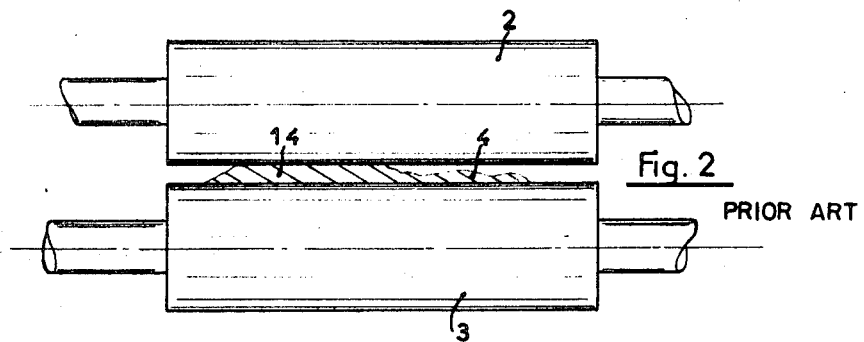
Figure 3:
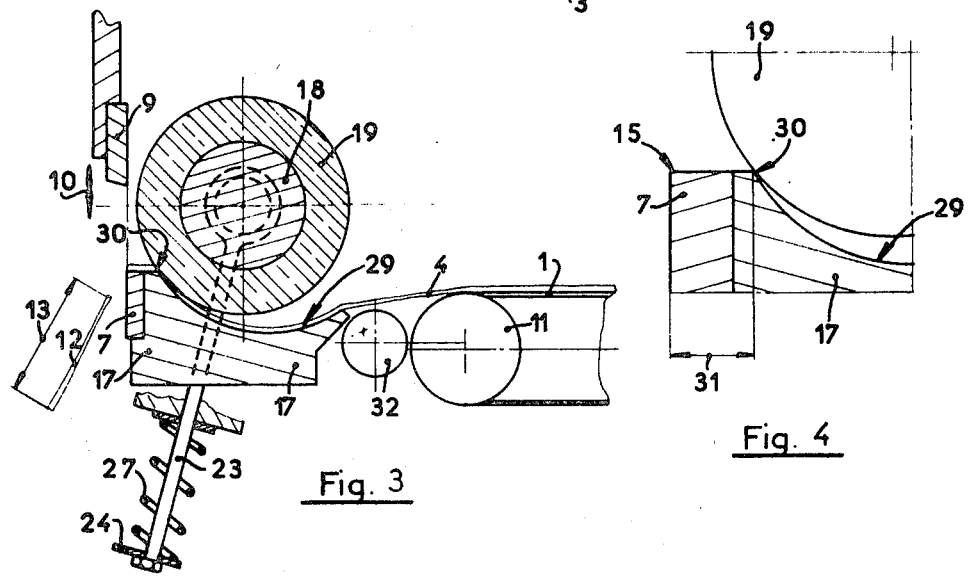
Figure 4:
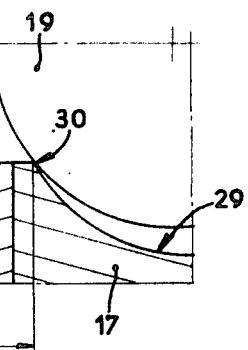
Figure 5:
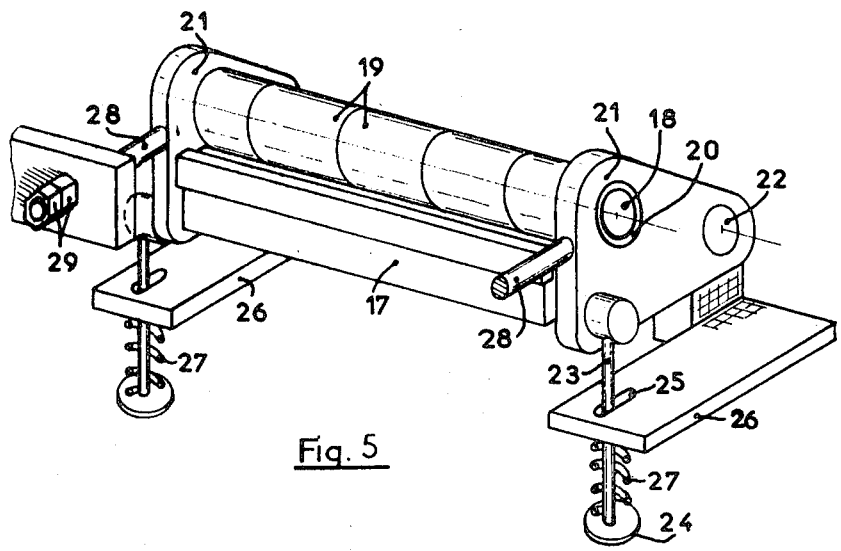
Figure 6:
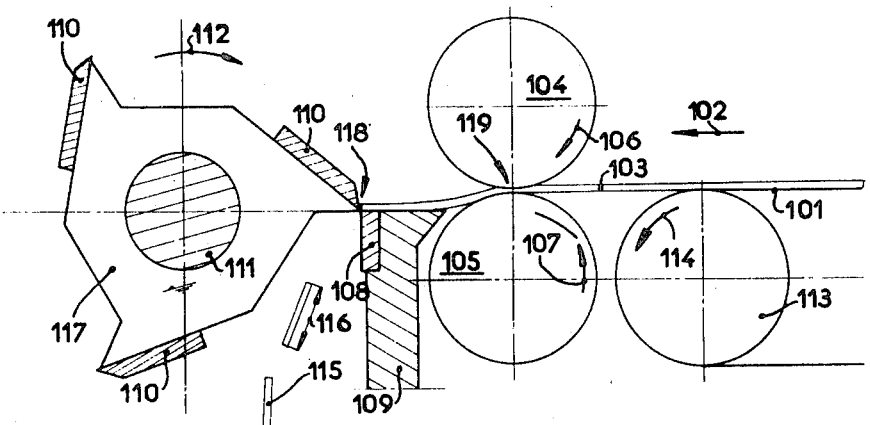
Figure 7:
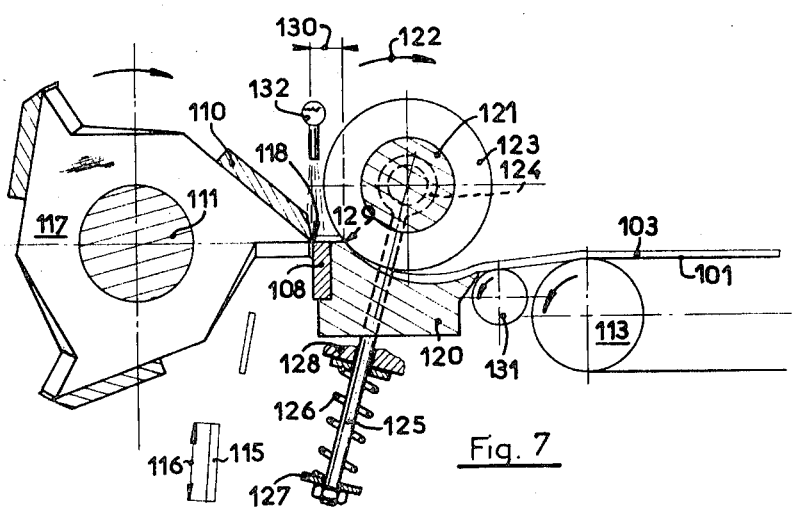
Figure 8:
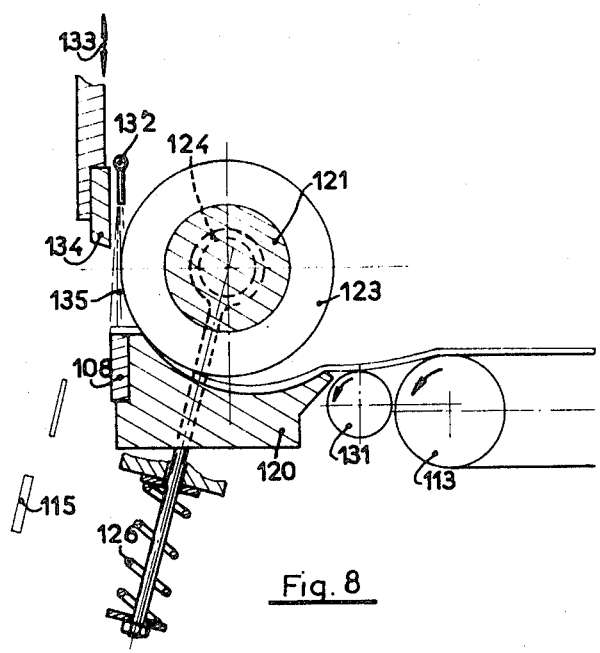

A cutting machine and alternatives thereof in accordance with the invention will now be described by way of examples only with reference to the accompanying drawings, in which:

FIG. 1 is a sectional view through the drive rollers and cutting blades of a known type of machine, FIG. 2 is a front view of the drive rollers shown in FIG. 1, illustrating the poor transverse retention when an excessively thick layer of material is introduced through them, FIG. 3 is a sectional view through the drive and cutter of a machine in accordance with the invention, FIG. 4 is an enlarged sectional view of a detail take from FIG. 3, FIG. 5 is a perspective view showing the drive rollers and mountings thereof, of the machine in accordance with the invention, FIG. 6 is a sectional view through the drive and cutter of a known type of machine having rotating blades, FIG. 7 is a sectional view through the drive and cutter of an alternative type of machine in accordance with the invention which employs a rotary blade, and FIG. 8 is a section view similar to FIG. 7 but in which the machine employs an alternative type of blade.

FIGS. 1 and 2 show a known type of cutting machine which comprises an endless belt 1 carrying a layer 4 formed from a loose bulk of the material to be cut towards the nip between two rollers 2 and 3. These rollers 2 and 3 turn in opposite directions, as shown by the arrows 5 and 6 respectively, and are rigid, generally consisting of grooved steel rollers.

Down flow from the feed rollers 2 and 3, the layer of material 4 passes over a lower cutting blade 7 which is held in place by a fixed support 8. A moving blade 9, positioned above the fixed blade 7, has a reciprocating rising and falling movement (as shown by the arrow 10). A roller 11 drives the feed belt 1. The roller 2 and 3 turn with an intermittent movement, that is to say, they remain still while the upper blade 9 falls and then turn when the blade 9 is rising. Finally, the machine ejects cuttings 12, the length of which is predetermined by the speed at which the feed rollers 2, 3 and 11 turn during the interval while the blade 9 separates from the blade 7.

This known system has the disadvantage of inadequately gripping the material of the layer 4, both in the longitudinal and transverse directions, and as a result of this bad retention, the material tends to pack tight between the two blades 7 and 9, from which jamming may be caused. In fact, when an excessively thick part 14 of the layer 4 (as shown in FIG. 2) is introduced into the feed rollers 2 and 3, the rigid upper roller 2 cannot bear on the other thinner zones of the layer. In consequence, at the moment of the cut, the material not held by the rollers 2 and 3 is dragged by the upper blade 9, and therefore jamming of the machine can be caused.

In addition, in the longitudinal direction, it will be seen that at the moment when the upper cutting blade 9 crosses the blade 7, all the threads, tissues or fibers which have an end between a cutting point 15 and a retention point 16 on the machine are not held, which implies a similar disadvantage to that in the above case, in that jamming may occur.

FIGS. 3, 4 and 5 show a machine of the type wherein the retention of the fibers both in the transverse and in the longitudinal direction is improved. To provide this improvement the rollers 2 and 3 are replaced by a driving device which comprises a fixed transverse trough 17 below a revolving shaft 18 which extends transversely across the machine. A series of flexible rings 19 made from a rubber or a plastics material are fitted on the shaft 18. The shaft 18 is supported at its ends by bearings 20 which are carried in swinging plates 21, and each of the plates 21 is pivoted on a fixed shaft 22 positioned upflow from the trough 17. A connecting rod 23 is linked to the plates 21 by its upper end, whilst its lower end carries a stop 24. This connecting rod 23 passes through an opening 25 in a fixed plate 26, through which it can slide freely. A compression spring 27 is fitted on each connecting rod 23 between the plate 26 and the stop 24 and in the majority of cases it is useful to provide a very powerful spring 27 which will tend to draw the flexible rings 19 very tightly against the trough 17.

In order to prevent the flexible rings 19 from rubbing and possibly wearing on the trough 17 when there is not material passing through, fixed stops 28 are provided, one at each side of the machine to engage with the forward edge of the plates 21 when they are at their front position. These stops 28 have screwed engagement with fixed plates, and can be adjusted to limit the front position by turning them in their plates, and the stops can be locked by means of nuts 29.

The upper face $29^1$ of the transverse trough 17 (as shown in FIGS. 3 and 4) has a concave shape with its rear edge lower in relation to its front edge, its front edge forming a transverse horizontal edge 30 which constitutes the generatrix of contact or of tangency with the periphery of the flexible rings 19. The lower fixed blade 7 is attached directly to the trough 17, immediately 'down-flow' of the holding edge 30. It will be seen, therefore, that the distance 31 between the cutting point 15 and the retention point at the holding edge 30 of the material to be cut is considerably reduced and is in this case approximately equal to the thickness of the lower blade 7.

In order to facilitate the entry of the layer 4 of material into the trough 17, a small roller 32 is interposed between this trough 17 and the existing drive roller 11 of the feed belt 1.

In this example, as in known machines, the shaft 18 and the rollers 11 and 32 are given an intermittent rotary movement, synchronized with the up and down movement of the moving upper blade 9. The length 13 of the cuttings 17 can be regulated as required by controlling the speed of the shaft 18 and rollers 11 and 32, during the rising of the blade 9.

When in use, the rotation of the shaft 18 and rubber rings 19 advances the layer 4 of material in the trough 17. By the simultaneous action of the flexibility of the rings 19 and the load applied to the shaft 18 by the springs 27, the layer of material remains tightly and solidly held across the full width of the machine at the level of the edge 30, even if an excess thickness appears locally in the layer 4. In addition, since the distance 31 between the holding edge 30 and the cutting point 15 is small, the material is held firmly in the longitudinal direction.

FIG. 6 shows a cutting machine of known type having rotating blades. This machine comprises an endless feed belt 101 which brings forward (in the direction of the arrow 102) a layer 103 of material to be cut. The layer 103 passes between two drive rollers 104 and 105 which turn in opposite directions, as shown by the arrows 106 and 107 respectively the rollers being rigid and are usually made of steel, having a grooved surface.

'Down-flow' from the driving rollers 104 and 105, the layer 103 passes over a lower fixed cutting blade 108 supported by a support member 109. One or more rotating blades 110 fixed on a transverse shaft 111, which turn in the direction shown by the arrow 112, come periodically in contact with the lower fixed blade 108, and thus carry out the cutting of the material. The roller 113 driving the feed belt 101, and the rollers 104 and 105 turn with a regulatable continuous movement, the movement of the roller 113 being indicated by the direction of the arrow 114. The machine ejects cuttings 115, the length 116 of which is determined by a regulation of the feeding speed of the rollers 104, 105 and 113, in relation to the speed of rotation of the shaft 111 carrying the blades 110.

This known system has the disadvantage set out in relation to the aforementioned known type of machine, that is to say, the tissues threads or fibers which have an end between the cutting point 118 and the retention point 119 are not held and also the machine deals inadequately with an excessively thick layer of material.

It is found, that the material of the layer 103 is subjected to appreciable heating during the cutting operation of the blades 108 and 110, and due to this fussion is observed if the material being cut has a low melting temperature. The material thus has a tendency to agglomerate, so that the cuttings 115 obtained are of poor quality.

FIG. 7 shows an alternative type of machine in accordance with the invention wherein a rotary blade is employed and also wherein the retention of the fibers both in the transverse and longitudinal directions is improved. To provide this improvement a fixed trough 120 surmounted by a shaft 121 is used. The latter turns in the direction indicated by the arrow 122, and it is fitted with a series of flexible rings 123 made for example from a plastics or a rubber material. This shaft 121 is mounted by its ends in bearings 124 each of which is subject, by means of a connecting rod 125, to the return action of a spring 126, fitted on the rod 125. Each spring 126 is compressed between an end washer 127 and a fixed support 128.

In order to prevent the flexible rings 123 rubbing on the trough 120 when there is not material in the machine, stops (not shown) are provided, on which the bearings 124 come to bear at the end of their forward travel.

The upper concave face of the trough 120 is provided with a horizontal transverse edge 129 at its front edge, said transverse edge 129 constituting the generatrix of contact or of tangency with the periphery of the flexible rings 123. The lower fixed blade is fixed directly to the trough 120, immediately 'down flow' of the holding edge 129. It will be seen therefore, that a distance 130 between the cutting point 118 and the retention point 129 of the material is considerably reduced, since it is approximately equal only to the thickness of the lower blade 108. To facilitate the entry of the layer of material 103 into the trough 120, a small roller 131 may be interposed between this trough 120 and the roller 113 of the feed belt 101.

The length 116 of the cutting 115 produced by this machine is determined by the relation of the continuous speed of the components 113, 121 and 131 to the number of passes of the moving blades 110 in front of the fixed blade 108. For example, if the blade carrying shaft 111 rotates at 500 revolutions per minute and if it carries three blades 110 evenly spaced around its circumference, then to produce cuttings 115 with a length 116 of say 50 millimeters, the continuous feed speed of the layer of material supplied by the components 113, 121, and 131 must be:

3×500×0.05=75 meters per minute

In order to be able to vary the length 116 of the cuttings 115, it is advantageous to control the speed of rotation of the components 113, 121 and 131 by a speed regulator.

Adjustment of the moving blades 110 with relation to the fixed blade 108 may be carried out by either adjustment of the position of the bearings carrying the shaft 111, or by displacement of the feed system, principally the trough 120.

As in known machines of this type the moving blades 110 need not be mounted on the drum 117 parallel to the axis of the shaft, but may be inclined in relation to the generatrix of said revolving drum 117. Each blade 110 may be fitted on the drum 117 by having either the large or small side of its cross section against the circumference of the drum (the large side fitting against the drum as shown in FIG. 7). Furthermore, the fitting of the blades on the drum may include adjustment screws having lock nuts (not shown), the blades fitting on the screws to facilitate the adjustment.

With further reference to FIG. 7, a coolant distributor 132 may be mounted above the cutting zone, (i.e., above the fixed blade 108), said coolant distributor 132 projecting a jet of air or of liquid on to the material at the point of cutting, so that even if synthetic fibers with a relatively low melting point are being cut, risk of fusion or of agglomeration by untoward heating is minimized. The distributor 132 may also be used to eject a liquid possessing antistatic or lubricating properties, the effect of which may be added to those of cooling.

When in use the simultaneous action of the elasticity of the flexible rings, 123 and of the elastic return of the shaft 121 produced by the springs 126, ensures a very high degree of retention of the material in the layer 103 throughout the full width of the machine along the transverse edge 129, even if an excessive thickness appears locally in the layer. In addition, since the distance 130 between the retention edge 129 and the cutting point 118 is very small, the material is held substantially taut in the longitudinal direction.

FIG. 8 shows a further machine in accordance with the invention which has a blade 134, having a reciprocating movement (as shown by the arrow indication 133) in front of the fixed blade 108. This machine is similar to that of FIGS. 3 to 5, and likewise has a shaft 121 fitted with flexible rings 123, which turn on a fixed trough 120. In contrast to the machines of FIGS. 3 to 5, this machine is provided with the coolant distributor 132 placed between the moving blade 134 and the periphery of the flexible rings 123, in such a way as to project a jet 135 of cooling fluid directly into the cutting zone of the blades 108 and 134. As in the preceding example, the distributor 132 may also project a liquid possessing antistatic or lubricating properties, the effect of which may be added to those of cooling.

I claim:

1. A cutting machine for fibrous materials comprising a material feeding device and a cutting device, said material feeding device including a fixed member and a rotary member, said rotary member having a series of rings of resilient material carried by a common shaft, means for biasing said rotary member towards said fixed member, said fixed member having a concave trough defining with the surface of said rotary member a gap of diminishing width with the nip of the feeding device being formed at the smallest width.

2. A cutting machine according to claim 1, wherein a fixed cutting blade forming part of said cutting device is fixed to said fixed member adjacent but down-flow of the nip between said fixed and said rotary members.

3. A cutting machine according to claim 1, wherein said rings are made from a rubber material.

4. A cutting machine according to claim 1, wherein said rings are made from a plastics material.

5. A cutting machine according to claim 1, wherein there are provided at the ends of said rotary member adjustable stops which regulate the extent of the movement of that member under the action of is resilient loading.

6. A cutting machine according to claim 1, wherein there is a feed belt for delivering material to the driving device.

7. A cutting machine according to claim 6, wherein a small transverse roller is provided between said feed and said driving device, which also turns synchronously with said rotary member.

8. A cutting machine according to claim 1, wherein said cutting device comprises a lower fixed blade and an upper blade with a rising and falling movement.

9. A cutting machine according to claim 1, wherein said cutting device comprises a lower fixed blade with which there cooperate several rotating blades carried by a drum.

10. A cutting machine according to claim 1, wherein a coolant distributor is provided above said cutting device.

* * * * *